US010915565B2

(12) United States Patent
Ohira et al.

(10) Patent No.: US 10,915,565 B2
(45) Date of Patent: Feb. 9, 2021

(54) RETRIEVAL RESULT PROVIDING DEVICE AND RETRIEVAL RESULT PROVIDING METHOD

(71) Applicant: ALPINE ELECTRONICS, INC., Tokyo (JP)

(72) Inventors: Masaaki Ohira, Tokyo (JP); Yuki Nakahara, Tokyo (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 28 days.

(21) Appl. No.: 16/263,272

(22) Filed: Jan. 31, 2019

(65) Prior Publication Data

US 2019/0251110 A1    Aug. 15, 2019

(30) Foreign Application Priority Data

Feb. 15, 2018   (JP) ................ 2018-025081

(51) Int. Cl.
| | |
|---|---|
| *G06F 40/30* | (2020.01) |
| *G10L 15/22* | (2006.01) |
| *G06F 16/38* | (2019.01) |
| *G06F 16/33* | (2019.01) |
| *G06F 3/16* | (2006.01) |
| *G06F 16/332* | (2019.01) |
| *G10L 25/54* | (2013.01) |

(Continued)

(52) U.S. Cl.
CPC ............. *G06F 16/38* (2019.01); *G06F 3/167* (2013.01); *G06F 16/3329* (2019.01); *G06F 16/3344* (2019.01); *G06F 40/205* (2020.01);

*G06F 40/289* (2020.01); *G10L 15/26* (2013.01); *G10L 25/54* (2013.01)

(58) Field of Classification Search
CPC .......... G10L 15/00; G10L 15/22; G10L 17/00
See application file for complete search history.

(56) References Cited

U.S. PATENT DOCUMENTS 7,139,717 B1 *  11/2006  Abella ................ G10L 15/1822
                                                            704/275
9,116,989 B1 *   8/2015  Ehlen .................. G06F 3/04883
(Continued)

FOREIGN PATENT DOCUMENTS

JP          2005-190334 A        7/2005

*Primary Examiner* — Shreyans A Patel
(74) *Attorney, Agent, or Firm* — Brinks Gilson & Lione (57) ABSTRACT

A retrieval result providing device includes a retrieval unit which acquires an individual retrieval result having item values of a plurality of items by a retrieval based on a keyword, an unprocessed sentence generation unit which generates an unprocessed sentence where retrieval result corresponding sentences with the item values arranged are arranged, an output sentence generation unit which performs at least one of a first process of erasing some of the sentences on the basis of a commonality between a word and the keyword contained in the retrieval result corresponding sentences, a second process of erasing some of the sentences on the basis of a commonality of the item values of specific items in the different sentences, and a third process of erasing some of the sentences on the basis of a commonality of the item values of a plurality of different items in one sentence so as to generate an output sentence, and an output sentence output unit which outputs a voice based on the output sentence.

11 Claims, 5 Drawing Sheets

(51) Int. Cl.
*G06F 40/205* (2020.01)
*G06F 40/289* (2020.01)
*G10L 15/26* (2006.01)

(56) References Cited

U.S. PATENT DOCUMENTS

| | | | | |
|---|---|---|---|---|
| 2009/0209319 | A1* | 8/2009 | Okada | G07F 17/3209 |
| | | | | 463/20 |
| 2009/0210411 | A1* | 8/2009 | Murata | G10L 15/1822 |
| 2011/0010177 | A1* | 1/2011 | Nakano | G10L 15/18 |
| | | | | 704/257 |
| 2014/0136187 | A1* | 5/2014 | Wolverton | G10L 15/22 |
| | | | | 704/9 |
| 2017/0293610 | A1* | 10/2017 | Tran | G06Q 10/025 |
| 2019/0020609 | A1* | 1/2019 | Asukai | G06F 16/3329 |
| 2019/0073598 | A1* | 3/2019 | Giovannini | G06N 5/043 |
| 2019/0237068 | A1* | 8/2019 | Canim | G06N 5/048 |

* cited by examiner

| FACILITY ID | FACILITY ADDRESS | FACILITY GENRE/ FACILITY BRAND | FACILITY NAME | FACILITY POSITION |
|---|---|---|---|---|
| A0001 | C TOWN OF A CITY OF B PREFECTURE | X RESTAURANT (FACILITY BRAND) | X RESTAURANT IN C TOWN | ~ ← RA1 |
| A0002 | D TOWN OF A CITY OF B PREFECTURE | X RESTAURANT (FACILITY BRAND) | X RESTAURANT IN D TOWN | ~ ← RA2 |
| A0003 | E TOWN OF A CITY OF B PREFECTURE | X RESTAURANT (FACILITY BRAND) | X RESTAURANT IN E TOWN | ~ ← RA3 |
| A0004 | G TOWN OF F CITY OF B PREFECTURE | X RESTAURANT (FACILITY BRAND) | X RESTAURANT IN G TOWN | ~ ← RA4 |
| ... | ... | ... | ... | ... |
| B0001 | J TOWN OF I CITY OF H PREFECTURE | PIZZA (FACILITY GENRE) | PIZZA Y SHOP | ~ ← RB1 |
| B0002 | J TOWN OF I CITY OF H PREFECTURE | CAFÉ (FACILITY GENRE) | Y SHOP | ~ ← RB2 |
| B0003 | J TOWN OF I CITY OF H PREFECTURE | Y SHOP (FACILITY BRAND) | Y SHOP IN J TOWN | ~ ← RB3 |
| ... | ... | ... | ... | ... |

FIG. 3A

| | HEAD WORD | FACILITY ADDRESS | FACILITY GENRE/ FACILITY BRAND | FACILITY NAME |
|---|---|---|---|---|
| UNPROCESSED SENTENCE | | | | |
| RETRIEVAL RESULT CORRESPONDING SENTENCE | <1ST ITEM> | <IN> C TOWN OF A CITY OF B PREFECTURE | <OF> X RESTAURANT | <IS> X RESTAURANT IN C TOWN | ← BA1
| RETRIEVAL RESULT CORRESPONDING SENTENCE | <2ND ITEM> | <IN> D TOWN OF A CITY OF B PREFECTURE | <OF> X RESTAURANT | <IS> X RESTAURANT IN D TOWN | ← BA2
| RETRIEVAL RESULT CORRESPONDING SENTENCE | <3RD ITEM> | <IN> E TOWN OF A CITY OF B PREFECTURE | <OF> X RESTAURANT | <IS> X RESTAURANT IN E TOWN | ← BA3

FIG. 3B

| | HEAD WORD | FACILITY ADDRESS | FACILITY GENRE/ FACILITY BRAND | FACILITY NAME |
|---|---|---|---|---|
| UNPROCESSED SENTENCE | | | | |
| RETRIEVAL RESULT CORRESPONDING SENTENCE | <1ST ITEM> | <IN> J TOWN OF I CITY OF H PREFECTURE | <OF> PIZZA | <IS> PIZZA Y SHOP | ← BB1
| RETRIEVAL RESULT CORRESPONDING SENTENCE | <2ND ITEM> | <IN> J TOWN OF I CITY OF H PREFECTURE | <OF> CAFÉ | <IS> Y SHOP | ← BB2
| RETRIEVAL RESULT CORRESPONDING SENTENCE | <3RD ITEM> | <IN> J TOWN OF I CITY OF H PREFECTURE | <OF> Y SHOP | <IS> Y SHOP IN J TOWN | ← BB3

FIG. 4A (A1)

| HEAD WORD | FACILITY ADDRESS | FACILITY GENRE/ FACILITY BRAND | FACILITY NAME |
|---|---|---|---|
| <1ST ITEM> | <IN> C TOWN OF A CITY OF B PREFECTURE | <OF> X RESTAURANT | <IS> X RESTAURANT IN C TOWN |
| <2ND ITEM> | <IN> D TOWN OF A CITY OF B PREFECTURE | <OF> X RESTAURANT | <IS> X RESTAURANT IN D TOWN |
| <3RD ITEM> | <IN> E TOWN OF A CITY OF B PREFECTURE | <OF> X RESTAURANT | <IS> X RESTAURANT IN E TOWN |

OUTPUT SENTENCE (A2)

| |
|---|
| 1ST ITEM IS IN C TOWN |
| 2ND ITEM IS IN D TOWN |
| 3RD ITEM IS IN E TOWN |

OUTPUT SENTENCE

FIG. 4B (B1)

| HEAD WORD | FACILITY ADDRESS | FACILITY GENRE/ FACILITY BRAND | FACILITY NAME |
|---|---|---|---|
| <1ST ITEM> | <IN> J TOWN OF I CITY OF H PREFECTURE | <OF> PIZZA | <IS> PIZZA Y SHOP |
| <2ND ITEM> | <IN> J TOWN OF I CITY OF H PREFECTURE | <OF> CAFÉ | <IS> Y SHOP |
| <3RD ITEM> | <IN> J TOWN OF I CITY OF H PREFECTURE | <OF> Y SHOP | <IS> Y SHOP IN J TOWN |

OUTPUT SENTENCE (B2)

| |
|---|
| 1ST ITEM IS PIZZA Y SHOP |
| 2ND ITEM IS Y SHOP OF CAFÉ |
| 3RD ITEM IS Y SHOP IN J TOWN |

OUTPUT SENTENCE

RETRIEVAL RESULT PROVIDING DEVICE AND RETRIEVAL RESULT PROVIDING METHOD

RELATED APPLICATIONS

The present application claims priority to Japanese Patent Appln. No. 2018-025081, filed Feb. 15, 2018, the entire disclosure of which is hereby incorporated by reference.

BACKGROUND

1. Field of the Disclosure

The present disclosure relates to a retrieval result providing device and a retrieval result providing method, and particularly to a retrieval result providing device and a retrieval result providing method which perform a retrieval on the basis of a keyword input by voice and provide a retrieval result by voice.

2. Description of the Related Art

Conventionally, there is known a retrieval result providing device which recognizes a retrieval request sentence to request a retrieval based on a keyword spoken by a user, performs the retrieval based on the keyword, and provides a retrieval result by voice. In some implementations, the retrieval result providing device is configured as an in-vehicle device which is provided in a vehicle. In a case where the user in the vehicle speaks a retrieval request sentence (as an example, a sentence "Search a fast-food store near") which contains a keyword "fast-food store" (which is one of genres of facilities) and requests a retrieval of a fast-food store near the vehicle, the retrieval result providing device performs the corresponding retrieval, and provides a facility address, a facility genre, and a facility name of each fast-food store found in the retrieval as retrieval results by voice.

In general, the retrieval result providing device of the related art obtains one or more individual retrieval results which include item values of one or more items as the retrieval results. In the above example, the retrieval result providing device obtains the individual retrieval result which includes the item values of three items such as the facility address, the facility genre, and the facility name. Then, the retrieval result providing device of the related art provides the individual retrieval results with the item values arranged according to a predetermined rule by voice in a predetermined order.

JP 2005-190334 A, for example, discloses a technique in which a plurality of individual retrieval results are put together into one according to a predetermined condition (for example, a condition of a common address) when the retrieval results based on the keyword (retrieval key) are displayed as a list, and the number of the listed individual retrieval results is set to small to improve the convenience of the user.

SUMMARY

In a case where a retrieval result is provided by voice, the user needs to sequentially understand the content of the voice, unlike a case where the retrieval result is displayed. However, in methods of the related art, the individual retrieval results arranged with the item values according to the predetermined rule are uniformly provided by voice in a predetermined order. Therefore, the volume of information provided by voice as the individual retrieval results may be increased significantly. Thus, the user may be confused when trying to sequentially understand the content of the voice.

The present disclosure has been made in view of such problems, and an object of the present disclosure is to enable a user to easily sequentially understand content of a voice when a retrieval result of a retrieval based on the keyword is provided by voice.

In order to address the above problems, one implementation of a retrieval result providing device according to the present disclosure recognizes a voice collected by a sound collecting device, performs a retrieval based on the keyword in a case where a keyword is contained and the retrieval request sentence to request the retrieval based on the keyword is contained in the recognized voice, acquires one or more individual retrieval results containing item values of one or more items, and generates an unprocessed sentence in which retrieval result corresponding sentences based on the individual retrieval result are arranged in a predetermined order, and the item values are arranged according to a predetermined rule in each of the retrieval result corresponding sentences. Then, the retrieval result providing device performs at least one of a first process in which some of the retrieval result corresponding sentences are erased on the basis of a commonality between a word and the keyword contained in the retrieval result corresponding sentences from each of the retrieval result corresponding sentences contained in the unprocessed sentence, a second process in which some of the retrieval result corresponding sentences are erased on the basis of a commonality of the item value of a specific item in the different retrieval result corresponding sentences in the unprocessed sentence, and a third process in which some of the retrieval result corresponding sentences are erased on the basis of a commonality of the item values of a plurality of the different items in one retrieval result corresponding sentence contained in the unprocessed sentence. An output sentence from the unprocessed sentence is generated, and the voice based on the output sentence is output to a voice output device.

In some implementations configured as above, the retrieval result providing device does not output the unprocessed sentence by voice without change when the retrieval result is provided by voice, but performs at least any one of the first process, the second process, or the third process on the unprocessed sentence to generate the output sentence, and outputs the output sentence by voice. Then, the first process is a process of erasing some of the retrieval result corresponding sentences on the basis of a commonality between a word and the keyword contained in the retrieval result corresponding sentences from each of the retrieval result corresponding sentences contained in the unprocessed sentence. In this process, it is possible to erase the word having a commonality to the keyword which is already recognized by the user and is not necessary for the user to hear again as the retrieval result from the retrieval result corresponding sentences. An information volume of the retrieval result corresponding sentences is reduced, and the user is able to easily sequentially understand the content of the voice. In addition, the second process is a process of erasing some of the retrieval result corresponding sentences on the basis of a commonality of the item values of specific items in the different retrieval result corresponding sentences in the unprocessed sentence. In this process, it is possible to erase the word having a commonality in each retrieval result corresponding sentences from each of the retrieval result corresponding sentences. The retrieval result corresponding sentences are reduced in redundancy, and the user is able to easily sequentially understand the content of the voice. In addition, the third process is a process of erasing some of the retrieval result corresponding sentences on the basis of a commonality of the item values of a plurality of different items in one retrieval result corresponding sentence contained in the unprocessed sentence. In this process, it is possible to erase the word having a commonality in different items from one retrieval result corresponding sentence. One retrieval result corresponding sentence is reduced in redundancy, and the user is able to easily sequentially understand the content of the voice.

DETAILED DESCRIPTION OF THE DRAWINGS

Figure 1:
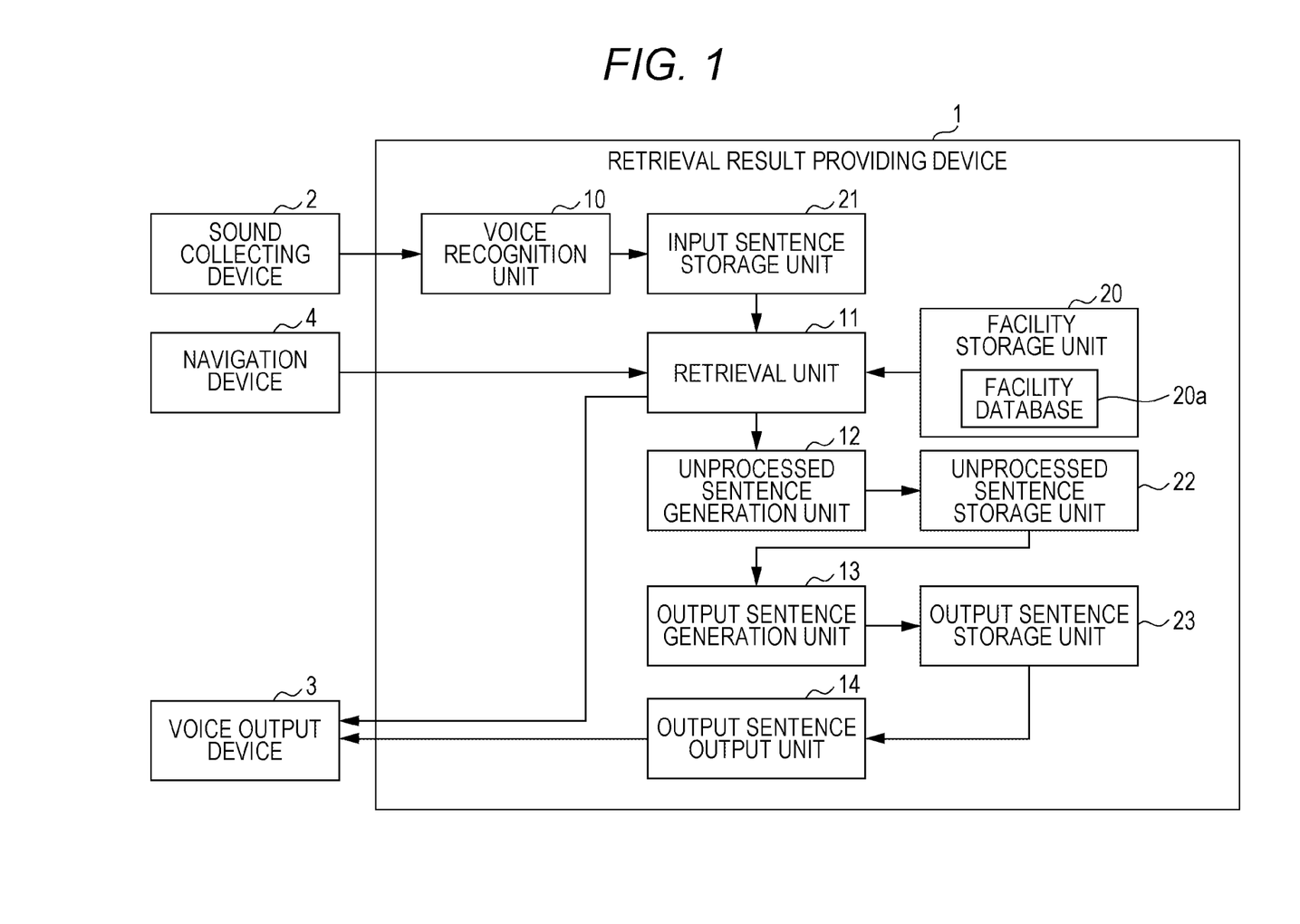
FIG. 1 is a block diagram illustrating an example of a functional configuration of a retrieval result providing device.

Hereinafter, embodiments and implementations of the present disclosure will be described with reference to the drawings. FIG. 1 is a block diagram illustrating an example of a functional configuration of a retrieval result providing device 1 together with a sound collecting device 2, a voice output device 3, and a navigation device 4 which are installed in a vehicle. The retrieval result providing device 1 may be a device which is installed in a vehicle and retrieves facilities to provide a retrieval result by voice when a passenger (hereinafter, referred to as "user") of the vehicle requests a retrieval of a facility.

The sound collecting device 2 is a device which may utilize a micrphone to collect a spoken voice of the user, and outputs the voice as a voice signal.

The voice output device 3 is a device which outputs a voice based on the voice signal through a speaker according to an input of the voice signal.

The navigation device 4 includes a display panel installed at a position such as the center portion of a dashboard which is viewable to the user. The navigation device 4 has a function of retrieving a guiding route up to a destination, and a function of displaying a map where the position of the vehicle and the guiding route are specified in the display panel and of guiding the retrieved guiding route. The navigation device 4 has a function of detecting a current position of the vehicle, and provides information indicating the current position of the vehicle in response to a request from a retrieval unit 11 (described below).

As illustrated in FIG. 1, implementations of the retrieval result providing device 1 may include a voice recognition unit 10, the retrieval unit 11, an unprocessed sentence generation unit 12, an output sentence generation unit 13, and an output sentence output unit 14 as the functional configurations. The functional blocks 10 to 14 may be configured by hardware, a digital signal processor (DSP), or software. For example, in a case where the functional blocks are configured by software, the functional blocks 10 to 14 are actually configured by a CPU, a RAM, and a ROM of a computer. The functional blocks are realized by operating a program stored in a recording medium such as the RAM, the ROM, a hard disk, or a semiconductor memory. In addition, the retrieval result providing device 1 includes a facility storage unit 20, an input sentence storage unit 21, an unprocessed sentence storage unit 22, and an output sentence storage unit 23 as storage units. The input sentence storage unit 21, the unprocessed sentence storage unit 22, and the output sentence storage unit 23 will be described below. The facility storage unit 20 stores a facility database 20a. Further, in some implementations, the facility storage unit 20 of the retrieval result providing device 1 is configured to store the facility database 20a. The database may be stored in the navigation device 4, and the retrieval result providing device 1 may be configured to obtain necessary information through communication with the navigation device 4.

Figure 2:
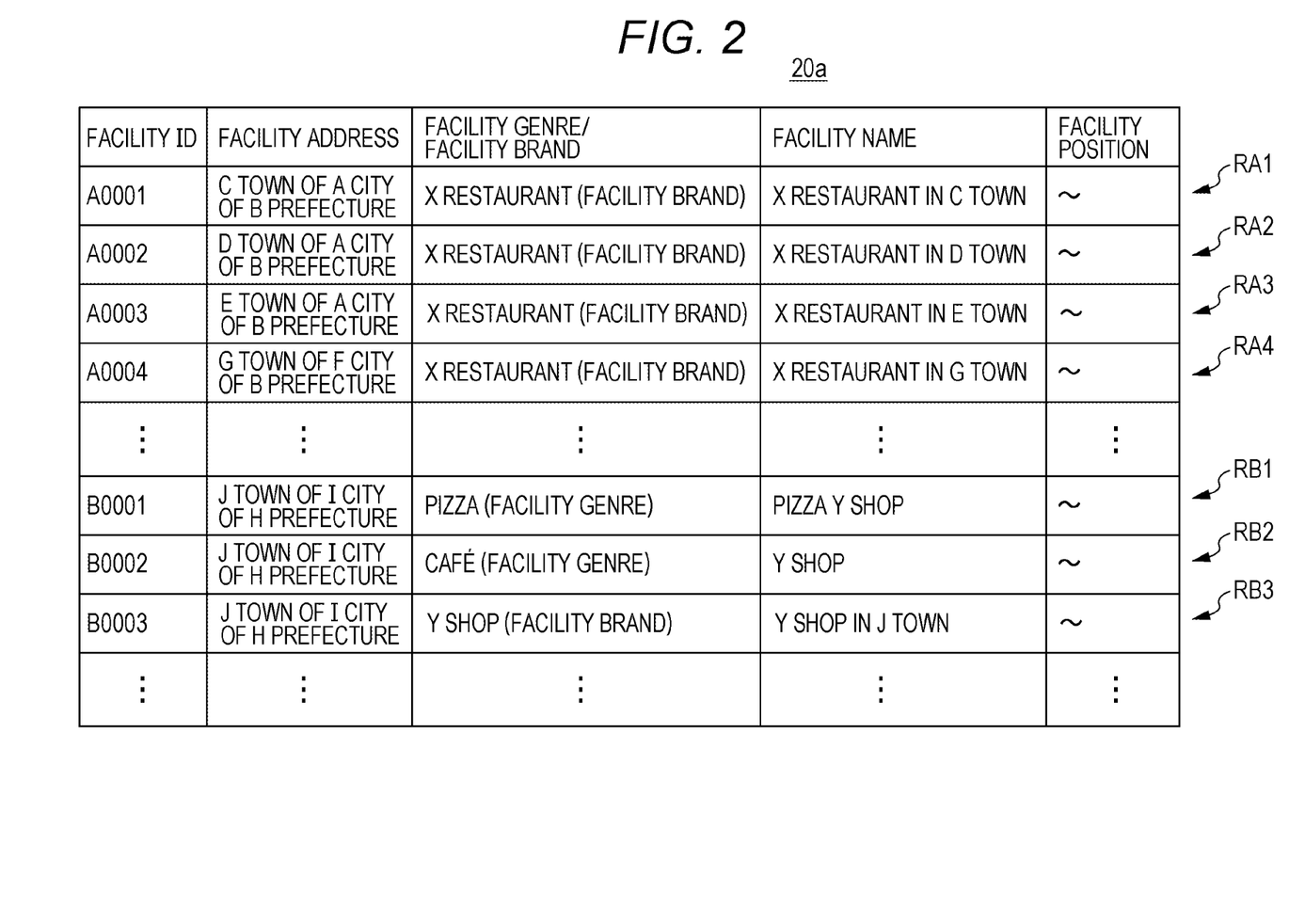
FIG. 2 is a diagram illustrating an example of content of a facility database.

FIG. 2 is a diagram illustrating an example of content of the facility database 20a. The facility database 20a is a database which includes a record for each facility on the map. As illustrated in FIG. 2, each record of the facility database 20a includes a facility ID field, a facility address field, a facility genre/facility brand field, a facility name field, and a facility position field as fields. In the facility ID field, there is stored a facility ID which is identification information to identify a facility.

In the facility address field, there is stored facility address information which indicates an address of a facility (hereinafter, referred to as "facility address"). Further, in some implementations, the facility address indicated by the facility address information of one facility is not an exact address indicating the position of the one facility as a pinpoint, but an address indicating an administrative district of a predetermined level to which the position of the one facility belongs. The facility address information is information based on an assumption that the information is output by voice as a retrieval result, and may be information with which the user can get a general position of the facility. In addition, if the facility address information is information indicating the exact address of the facility, an information volume of the facility address information is increased. When the user hears the facility address information, the user may not understand the position of the facility.

In the facility genre/facility brand field, there is stored facility genre information indicating a genre of a facility (hereinafter, referred to as "facility genre"), or facility brand information indicating a brand of a facility (hereinafter, referred to as "facility brand"). In a case where a plurality of facilities of one brand are exhibited, the facility brand becomes the brand name. For example, in a case where there are three operating companies of a convenience store, the brand names of three operating companies become the facility brands. In some implementations, in a case where a corresponding facility belongs to the brand, the facility brand information indicating the brand is stored in the facility genre/facility brand field. In the following description, when certain words mean the facility genre, the words will be appropriately attached with (facility genre). In addition, when certain words mean the facility brand, the words will be attached with (facility brand).

In the facility name field, there is stored facility name information which indicates a name of a facility (hereinafter, referred to as "facility name"). In the facility position field, there is stored facility position information which indicates a position of a facility (hereinafter, referred to "facility position"). The facility position information is information indicating a position of a facility on the map as a pinpoint. For example, the facility position information is configured by a combination of a latitude and a longitude.

In a case where a predetermined trigger occurs, the voice recognition unit 10 transitions to a voice recognition mode, and recognizes a voice based on the voice signal input from the sound collecting device 2. After the transition to the voice recognition mode, the voice recognition unit 10 releases the transition to the voice recognition mode at an appropriate timing based on the input voice signal. In some implementations, the predetermined trigger is an operation of a dedicated button which is installed in the retrieval result providing device 1. In a case where the user wants to retrieve the facility using the retrieval result providing device 1, the user operates the dedicated button, and speaks a retrieval request sentence. The retrieval request sentence is a sentence which contains a keyword and to request a retrieval of a facility on the basis of the keyword.

For example, the retrieval request sentence is "I want to go to X restaurant in A city". In this example, the "A city" indicating a name of a region (hereinafter, referred to as "region name"), and the "X restaurant" are keywords. The retrieval request sentence is a sentence to request a retrieval of the X restaurant located in A city. For example, the retrieval request sentence is "Search Y shop near". In this example, the "Y shop" is a keyword. The retrieval request sentence is a sentence to request a retrieval of the Y shop located near the vehicle.

Then, the voice recognition unit 10 recognizes the voice signal input from the sound collecting device 2, generates text based on the voice signal, and generates input sentence information. Transforming the voice signal into text is appropriately performed by an existing voice recognition technique. The input sentence information thus generated is information obtained by making the content of the voice spoken by the user into text. The voice recognition unit 10 registers the generated input sentence information to the input sentence storage unit 21. As a result of the above process of the voice recognition unit 10, in a case where the user operates the dedicated button and speaks the retrieval request sentence, the input sentence information indicating the retrieval request sentence spoken by the user is registered in the input sentence storage unit 21.

Further, in some implementations, the voice recognition unit 10 independently performs the voice recognition. The voice recognition unit 10 may be configured to perform the voice recognition in cooperation with a device other than the retrieval result providing device 1. As an example, the retrieval result providing device 1 may be connected to a server device which has a voice recognition function through a network. The voice recognition unit 10 may be configured to perform the voice recognition in cooperation with the server device. In this case, all the processes of generating the input sentence information may be performed by the server device on the basis of the voice signal.

In addition, in some implementations, the voice recognition unit 10 performs the voice recognition when being triggered by the operation of the dedicated button. A voice spoken after the operation of the dedicated button is considered as a target voice to generate the input sentence information. In this regard, the following configuration may be considered. In a case where the voice recognition unit 10 performs continuously the voice recognition, and a predetermined specific sound (a specific word or a not-verbal sound such as clapping of hands) is recognized, the voice spoken thereafter may be recognized as a target voice to generate the input sentence information. In addition, a gesture recognition function may be installed in the retrieval result providing device 1. The voice recognition unit 10 may be configured to recognize a voice spoken after a specific gesture is made as a target voice to generate the input sentence information.

In a case where the input sentence information is registered in the input sentence storage unit 21 by the voice recognition unit 10, the retrieval unit 11 analyzes the registered input sentence information, retrieves a facility on the basis of the analysis result, and acquires one or more pieces of individual retrieval result information (described below). Hereinafter, the process of the retrieval unit 11 will be described in detail. Further, the process of analyzing the input sentence information of the retrieval unit 11 is implemented by appropriately performing a process such as a natural language process or an information summarizing process on the basis of an existing technique related to the sentence analysis.

First, the retrieval unit 11 analyzes the input sentence information, and extracts a keyword. Next, the retrieval unit 11 analyzes the input sentence information, and recognizes the meaning of the keyword, a relation of a plurality of keywords, the content of a modifier in the sentence, and the content of the predicate in the sentence. The retrieval unit determines a retrieval procedure on the basis of the above results. The retrieval procedure is a procedure of specifying the record corresponding to a facility to be found in the retrieval among the records of the facility database 20a (hereinafter, referred to as "retrieval target facility"). The retrieval procedure is configured to include a process of generating a retrieval formula used in the retrieval, and of performing a retrieval using the generated retrieval formula.

Next, the retrieval unit 11 performs the process according to the retrieval procedure, and specifies a record corresponding to the retrieval target facility among the records of the facility database 20a. Next, the retrieval unit 11 acquires the individual retrieval result information on the basis of the specified record (each of the plurality of records in a case where there are a plurality of specified records). The individual retrieval result information corresponding to one record is information containing the facility address information, the facility genre information, or the facility brand information (however, in a case where there is no information in the facility genre/facility brand field, both pieces of information), and the facility name information among the information having the one record. In other words, in a case where each field of the record is considered as an item and a value stored in each field is considered as an item value, the individual retrieval result information is configured to contain an item value of an item related to the facility address (facility address information), an item value of an item related to the facility genre/facility brand (facility genre information/facility brand information), and an item value of an item related to the facility name (facility name information).

For example, the retrieval request sentence indicated by the input sentence information is assumed as "I want to go to X restaurant of A city". In this case, first, the retrieval unit 11 analyzes the input sentence information, and extracts keywords (in this example, "A city" and "X restaurant"). Further, the retrieval unit 11 analyzes the input sentence information to recognize that "A city" as the keyword means the region name based on administrative divisions, and "X restaurant" as the keyword means a part of the facility name, that a relation between "A city" and "X restaurant" indicates that "X restaurant" is located in a region indicated by "A city", and that the predicate "want to go" means a request of retrieval of a facility. The retrieval unit recognizes that the retrieval request sentence indicated by the input sentence information is a sentence to request to find by a retrieval a facility containing the X restaurant in a part of the facility name in A city as the retrieval target facility. Next, the retrieval unit 11 determines the retrieval procedure of specifying the record corresponding to the retrieval target facility among the records of the facility database 20a, and performs the process according to the retrieval procedure.

In this example, the retrieval unit 11 generates a retrieval formula to specify the record corresponding to the facility (retrieval target facility) of which the facility address belongs to A city, and the facility name contains the words "X restaurant" on the basis of the value of the facility address field of each record of the facility database 20a and the value of the facility name field. Next, the retrieval unit 11 specifies the record corresponding to the retrieval target facility among the records of the facility database 20a on the basis of the retrieval formula. In this example, in a case where the content of the facility database 20a is the content illustrated in FIG. 2, the retrieval unit 11 specifies records RA1 to RA3 (the records of which the facility IDs are "A0001" to "A0003") as the records corresponding to the retrieval target facility. Further, a record RA4 (the record of which the facility ID is "A0004") contains the words indicating that the facility name of the corresponding facility is "X restaurant", but the facility address does not belong to A city (belonging to F city different from A city). Therefore, the retrieval unit 11 does not specify record as a record corresponding to the retrieval target facility.

Next, the retrieval unit 11 acquires the individual retrieval result information corresponding to each record on the basis of each specified record. For example, the individual retrieval result information corresponding to the record RA1 of the facility database 20a of FIG. 2 is information containing the facility address information of "C town of A city of B prefecture", the facility brand information of "X restaurant (facility brand)", and the facility name information of "X restaurant in C town".

For example, the sentence indicated by the input sentence information (retrieval request sentence) is assumed as "Search Y shop near". In this case, first, the retrieval unit 11 analyzes the input sentence information, and extracts the keyword ("Y shop" in this example). Next, the retrieval unit 11 analyzes the input sentence information, and recognizes that "Y shop" as the keyword means a part of the facility name, that the modifier "near" means the periphery of the vehicle, and that the predicate "Search" means a request to retrieve the facility. The retrieval unit recognizes the retrieval request sentence indicated by the input sentence information as a sentence to request to find by a retrieval the Y shop near the vehicle as the retrieval target facility. Next, the retrieval unit 11 determines the retrieval procedure of specifying the record corresponding to the retrieval target facility among the records of the facility database 20a, and performs the process according to the retrieval procedure.

In this example, the retrieval unit 11 requests a response of the information indicating the current position of the vehicle from the navigation device 4, and acquires the information. Next, the retrieval unit 11 compares the current position of the vehicle and the value of the facility position field of each record of the facility database 20a and, on the basis of the value of the facility name field, generates a retrieval formula specifying a record corresponding to the facility (retrieval target facility) of which the facility position is within a predetermined range about the current position of the vehicle and the facility name contains the words "Y shop". Next, the retrieval unit 11 specifies the record corresponding to the retrieval target facility among the records of the facility database 20a on the basis of the retrieval formula. In this example, in a case where the content of the facility database 20a is the content illustrated in FIG. 2, the retrieval unit 11 specifies records RB1 to RB3 (the records of which the facility IDs are "B0001" to "B0003") as the records corresponding to the retrieval target facility. Next, the retrieval unit 11 acquires the individual retrieval result information corresponding to each record on the basis of each specified record.

Further, there may be a case where the individual retrieval result information acquired by the retrieval unit 11 is zero. Besides a case where the record corresponding to the retrieval target facility is not registered in the facility database 20a, there may be a case where the recognition of the voice recognition unit 10 fails. In such a case, the retrieval unit 11 causes the voice output device 3 to output voice information indicating the fact that it is not possible to retrieve the facility. In the following, the description will be given about each functional block on an assumption that the retrieval unit 11 acquires one or more pieces of the individual retrieval result information.

The unprocessed sentence generation unit 12 generates the unprocessed sentence (described below) on the basis of each piece of the individual retrieval result information acquired by the retrieval unit 11. Hereinafter, the process of the unprocessed sentence generation unit 12 will be described.

First, the unprocessed sentence generation unit 12 generates a retrieval result corresponding sentence for each piece of the individual retrieval result information. The retrieval result corresponding sentence is a sentence introducing a facility corresponding to the individual retrieval result information. The item values (the facility address information, the facility genre information/facility brand information, and the facility name information) contained in the individual retrieval result information are arranged in the order of the facility address information, the facility genre information/facility brand information, and the facility name information (a predetermined rule). In addition, propositions, auxiliary verbs, and predetermined words are appropriately added in the retrieval result corresponding sentence along the predetermined rule.

The unprocessed sentence generation unit 12 generates the retrieval result corresponding sentence for each piece of the individual retrieval result information, and arranges the retrieval result corresponding sentences in the predetermined order to generate the unprocessed sentence. The order of the arrangement of the retrieval result corresponding sentences may be set arbitrarily. For example, the order of the arrangement may be a higher order as the retrieval result corresponding sentence corresponds to a higher record in the facility database 20a. In addition, for example, in a case where a facility is retrieved by reflecting the current position of the vehicle, the order of the arrangement may be a higher order as the retrieval result corresponding sentence corresponds to a facility nearer the current position of the vehicle (or as a facility is located where the vehicle more easily approaches).

Figure 3A:
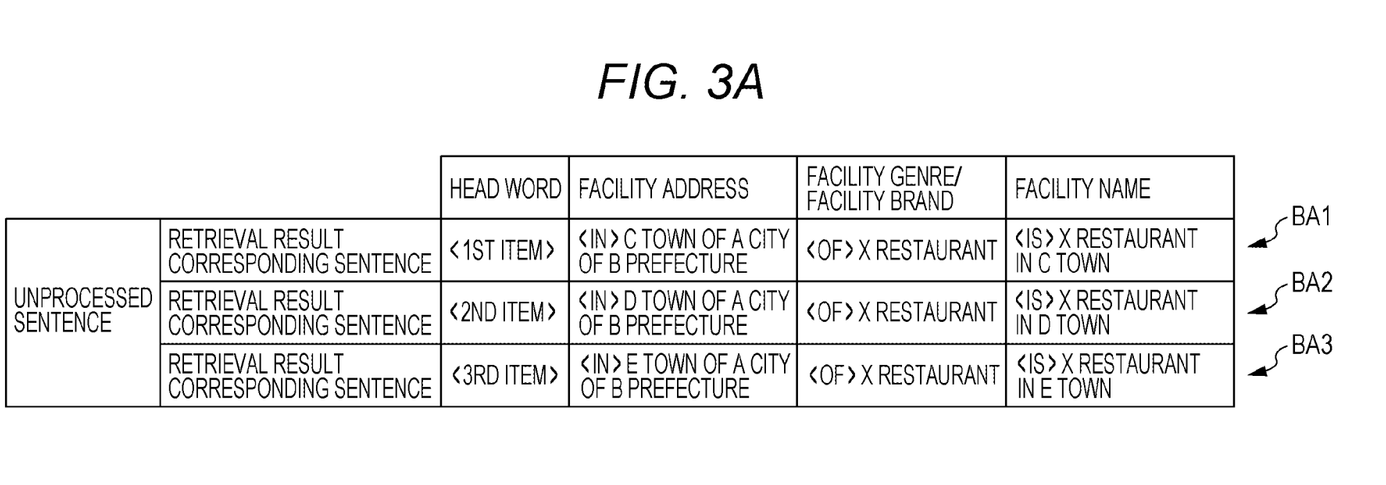
FIGS. 3A and 3B are diagrams illustrating an example of content of an unprocessed sentence.

FIG. 3A illustrates a state where the content of the unprocessed sentence generated by the unprocessed sentence generation unit 12 is suitable for the description in a case where the retrieval unit 11 acquires three pieces of the individual retrieval result information based on the records RA1 to RA3 of the facility database 20a of FIG. 2 according to the utterance of the retrieval request sentence "I want to go to X restaurant in A city". In particular, in FIG. 3A, a retrieval result corresponding sentence BA1 corresponds to the record RA1. A retrieval result corresponding sentence BA2 corresponds to the record RA2. A retrieval result corresponding sentence BA3 corresponds to the record RA3. In FIG. 3A, the words bounded by "<" and ">" indicate the words added according to the predetermined rule. As illustrated in FIG. 3A, a head word is added to the head of each retrieval result corresponding sentence contained in the unprocessed sentence. The head word is a word which simply specifies the order of the retrieval result corresponding sentence in the unprocessed sentence. As illustrated in FIG. 3A, the retrieval result corresponding sentence BA1 corresponding to the record RA1 is a sentence "<1st item>, <in> C town of A city of B prefecture, <of> X restaurant, <is> X restaurant in C town".

Figure 3B:
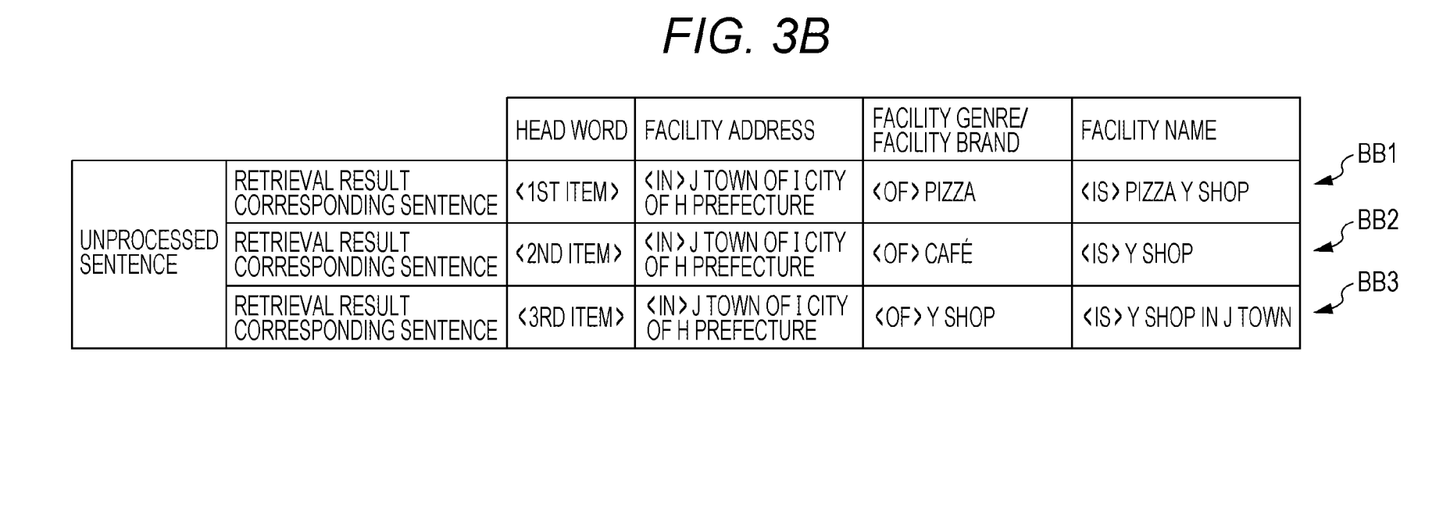

In addition, FIG. 3B illustrates a state where the content of the unprocessed sentence generated by the unprocessed sentence generation unit 12 is suitable for the description in a case where the retrieval unit 11 acquires three pieces of the individual retrieval result information based on the records RB1 to RB3 of the facility database 20a of FIG. 2 according to the utterance of the retrieval request sentence "I want to go to Y shop near". In particular, in FIG. 3B, a retrieval result corresponding sentence BB1 corresponds to the record RB1. A retrieval result corresponding sentence BB2 corresponds to the record RB2. A retrieval result corresponding sentence BB3 corresponds to the record RB3.

The unprocessed sentence generation unit 12 generates the unprocessed sentence, and registers unprocessed sentence information indicating the unprocessed sentence in the unprocessed sentence storage unit 22.

Further, as described below, in some implementations, the unprocessed sentence is not output by voice, but the output sentence generated by processing the unprocessed sentence is finally output by voice. In this regard, the unprocessed sentence is not necessarily a colloquial sentence which is assumed to be output by voice as illustrated in FIGS. 3A and 3B, but may be information which includes the retrieval result corresponding sentence in which the item values contained in the individual retrieval result information are arranged according to the predetermined rule, and the retrieval result corresponding sentences are arranged in the predetermined order.

Figure 4A:
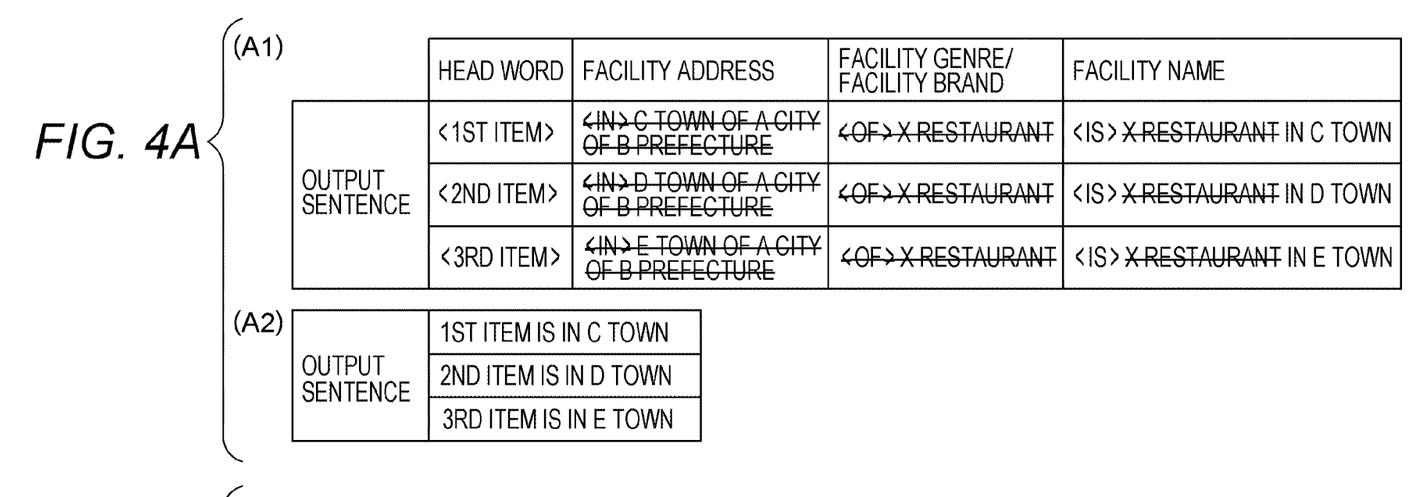
FIGS. 4A and 4B are diagrams illustrating an example of content of an output sentence.
Figure 4B:
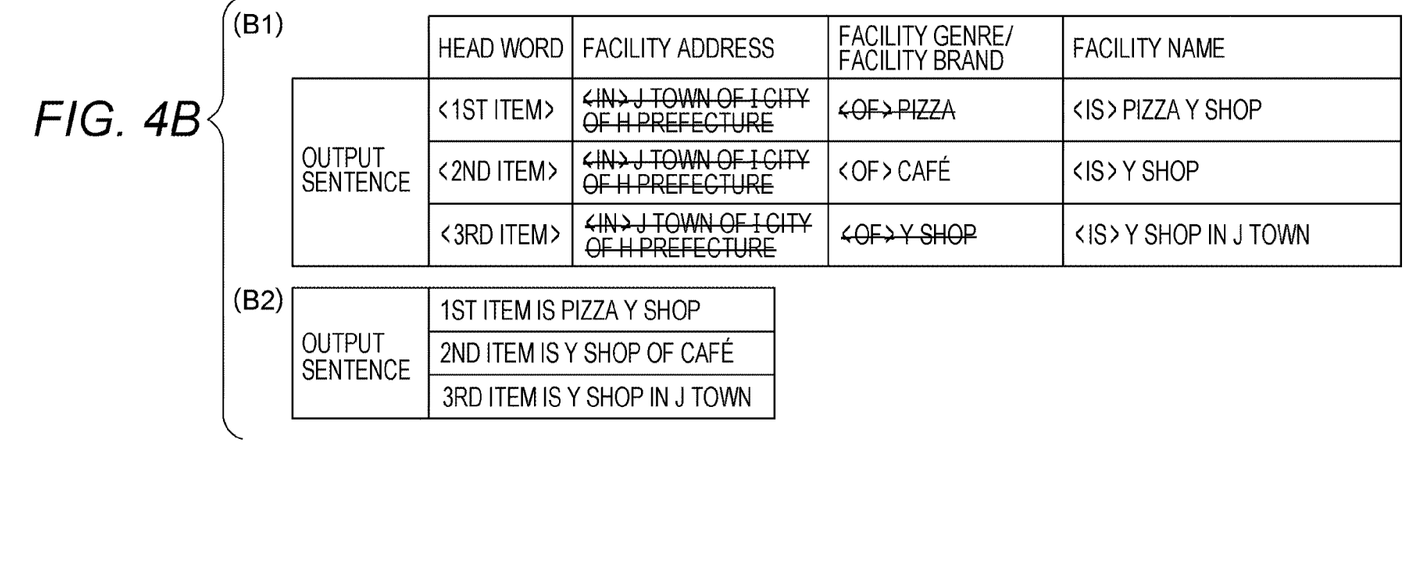

The output sentence generation unit 13 processes the unprocessed sentence generated by the unprocessed sentence generation unit 12, and generates the output sentence. As described below, the generated output sentence is finally output by voice as a retrieval result. (A1) and (A2) of FIG. 4A illustrate a state where the content of the output sentence generated on the basis of the unprocessed sentence of FIG. 3A is suitable for the description. In (A1), cancellation lines are added to the words to be erased in order to specify a difference between the unprocessed sentence and the output sentence. In (A2), the final output sentences are illustrated. Similarly, (B1) and (B2) of FIG. 4B illustrate a state where the content of the output sentence generated on the basis of the unprocessed sentence of FIG. 3B is suitable for the description. Hereinafter, the process of the output sentence generation unit 13 will be described using FIGS. 3A and 3B and 4A and 4B.

In some implementations, the output sentence generation unit 13 generates the output sentence from the unprocessed sentence by performing four processes, that is, a first process, a second process, a third process, and a fourth process.

The first process is a process of erasing some of the retrieval result corresponding sentences on the basis of a commonality between the word and the keyword contained in the retrieval result corresponding sentences. As described below, the first process is performed for the item related to the facility address, and the item related to the facility genre/facility brand. The second process is a process of erasing some of the retrieval result corresponding sentences on the basis of a commonality of the item values of the specific items in the different retrieval result corresponding sentences. As described below, the second process is performed for the item related to the facility address and the item related to the facility genre/facility brand. The third process is a process of erasing some of the retrieval result corresponding sentences on the basis of a commonality of the item values of a plurality of different items in one retrieval result corresponding sentence contained in the unprocessed sentence. As described below, the third process is performed for the item related to the facility genre/facility brand on the basis of a relation between the item and the item related to the facility name. The fourth process is a process of erasing the portion of the keyword from the item values of the items related to the facility names of a plurality of retrieval result corresponding sentences in a case where the facility brands of the facilities corresponding to the plurality of retrieval result corresponding sentences are matched. The fourth process is a process belonging to the first process in which some of the retrieval result corresponding sentences are erased on the basis of the commonality between the word contained in the retrieval result corresponding sentences and the keyword spoken by the user similarly to the first process.

The output sentence generation unit 13 performs a specific process among the first to third processes on a specific item in a specific state with one item as a unit of process. Hereinafter, the description will be given about a process which is performed on each item by the output sentence generation unit 13.

<1. Item Related to Facility Address (Item Value: Facility Address Information)>

The output sentence generation unit 13 performs the first process and the second process on the item related to the facility address (hereinafter, referred to as "facility address item").

<1-1. First Process on Facility Address Item>

Hereinafter, the description will be given about the first process which is performed on the facility address item by the output sentence generation unit 13. The output sentence generation unit 13 erases the facility address information from each of the retrieval result corresponding sentences contained in the unprocessed sentence in a case where the region name is contained in the keyword which is contained in the retrieval request sentence, and in a case where the region indicated by the region name and the region indicated by the facility address information of the facility address item are identical. The identity between the region indicated by the region name related to the keyword and the region indicated by the facility address information of the facility address item means that the region indicated by the facility address information of the facility address item belongs to the region indicated by the region name related to the keyword. For example, the unprocessed sentence of FIG. 3A is the unprocessed sentence which is generated on the basis of the retrieval request sentence "I want to go to X restaurant in A city". The retrieval request sentence contains the keyword related to the region name "A city". Then, in each of the retrieval result corresponding sentences BA1 to BA3 illustrated in FIG. 3A, the region (position) indicated by the facility address information is a region belonging to A city. The region indicated by the keyword "A city" and the region indicated by the facility address information of the facility address item are identical. Therefore, in this case, the output sentence generation unit 13 erases the facility address information from each of the retrieval result corresponding sentences BA1 to BA3 contained in the unprocessed sentence as illustrated in FIG. 4A.

With the above process, the following effects are achieved. In other words, in a case where the region name is contained in the retrieval request sentence as the keyword, the user recognizes that the facility address of the retrieved facility is associated with the region name related to the keyword in a predetermined state. In particular, the user recognizes that the facility address of the facility found in the retrieval belongs to the specific region in a case where a facility within the specific region is requested to be retrieved, for example, the retrieval request sentence "I want to go to X restaurant in A city". In such a case, the facility address information of the facility found in the retrieval is information which is already recognized by the user or roughly estimated, and can be said as information which the user does not need to hear again. In this regard, according to the process, the information which the user does not need to hear again can be erased from the information output by voice as the retrieval result. The information volume of the information can be reduced. The user is able to easily sequentially understand the content of the voice.

Herein, the identity between the region indicated by the region name related to the keyword and the region indicated by the facility address information of the facility address item does not mean that a character string indicating the region name related to the keyword and a character string indicating the facility address information of the facility address item are matched, but means that the concept indicated by the keyword and the concept indicated by the facility address information are identical. In this way, in a case where the concept indicated by the keyword and the concept indicated by the item value of a specific item are identical, the first process is performed. As a case where the item value of the specific item is erased from the retrieval result corresponding sentences, the following case is considered for example other than the case described in this embodiment.

For example, in a case where a schedule of the user is registered in advance, it is considered a case where the schedule registered in the month to which today belongs is sequentially output by voice as a retrieval result according to the utterance of a predetermined retrieval request sentence containing the word "this month" as a keyword. In this case, it is assumed that an item containing "Month+CE (Common Era)" as an item value is contained in the retrieval result corresponding sentences as an item. In this case, if the first process is not performed, the voice is output with the words "January 2018" in the head at every schedule when the retrieval result is provided. However, if the concept indicated by the keyword and the concept indicated by the item value of the item of the retrieval result corresponding sentence are matched, the first process is performed to erase the item value of the item from the retrieval result corresponding sentence. Therefore, it is possible to erase the word which is already recognized as the concept by the user from the information output by voice as the retrieval result.

<1-2. Second Process on Facility Address Item>

Hereinafter, the description will be given about the second process which is performed on the facility address item by the output sentence generation unit 13. The output sentence generation unit 13 erases the facility address information from each retrieval result corresponding sentence in a case where the value of the facility address information of each retrieval result corresponding sentence contained in the unprocessed sentence (the item value of the facility address item) is matched. For example, in each of the retrieval result corresponding sentences BB1 to BB3 contained in the unprocessed sentence of FIG. 3B, the value of the facility address information (facility address information) is matched to be "J town of I city of H prefecture". In this case, the output sentence generation unit 13 erases the facility address information from each of the retrieval result corresponding sentences BB1 to BB3 contained in the unprocessed sentence as illustrated in FIG. 4B.

With the above process, the following effects are achieved. In other words, when the retrieval result is provided by voice, it is possible to prevent the facility address of the same content to be repeatedly output by voice. The redundancy in the information output by voice can be reduced. The user is able to easily sequentially understand the content of the voice. In particular, in a case where all the facilities found in the retrieval have the same content of the facility address information, the facility address information does not affect a user's decision making when the user selects a facility. Therefore, in a case where all the facilities found in the retrieval have the same content of the facility address information, there is no disadvantage to the user when the retrieval result is provided by voice even if the facility address information is not output.

Further, in some implementations, the output sentence generation unit 13 erases the facility address information from each retrieval result corresponding sentence contained in the unprocessed sentence in a case where the value of the facility address information of each retrieval result corresponding sentence contained in the unprocessed sentence is matched. In this regard, the facility address information is not erased from the retrieval result corresponding sentence of the head of the unprocessed sentence. The facility address information may be erased from the second or later retrieval result corresponding sentence.

<2. Item Related to Facility Genre/Facility Brand (Item Value: Facility Genre Information/Facility Brand Information)>

The output sentence generation unit 13 performs the first process, the second process, and the third process on the item related to the facility genre/facility brand (hereinafter, referred to as "facility genre/facility brand item").

<2-1. First Process on Facility Genre/Facility Brand Item>

Hereinafter, the description will be given about the first process which is performed on the facility genre/facility brand item by the output sentence generation unit 13. The output sentence generation unit 13 erases the item value matched with the keyword from the retrieval result corresponding sentence in a case where the keyword contained in the retrieval request sentence is matched with the value of the item value (facility genre information/facility brand information) of the facility genre/facility brand item of the retrieval result corresponding sentence contained in the unprocessed sentence. For example, in each of the retrieval result corresponding sentences BA1 to BA3 of the unprocessed sentence of FIG. 3A, the item value of the facility genre/facility brand item is "X restaurant", and matched with "X restaurant" which is the keyword contained in the corresponding retrieval request sentence. Therefore, the output sentence generation unit 13 erases the facility genre information/facility brand information from each of the retrieval result corresponding sentences BA1 to BA3 contained in the unprocessed sentence as illustrated in FIG. 4A.

For example, the item value of the facility genre/facility brand item of the third retrieval result corresponding sentence BB3 of the unprocessed sentence of FIG. 3B is "Y shop", and matched with "Y shop" which is the keyword contained in the corresponding retrieval request sentence. Therefore, the output sentence generation unit 13 erases the facility genre information/facility brand information from the third retrieval result corresponding sentence BB3 contained in the unprocessed sentence as illustrated in FIG. 4B. With the above process, the similar effects to those described in <1-1. First Process on Facility Address Item> can be achieved.

<2-2. Second Process on Facility Genre/Facility Brand Item>

Next, the description will be given about the second process which is performed on the facility genre/facility brand item by the output sentence generation unit 13. The output sentence generation unit 13 erases the item value of the item from each retrieval result corresponding sentence in a case where the item value of the facility genre/facility brand item (facility genre information/facility brand information) of each retrieval result corresponding sentence contained in the unprocessed sentence is matched. For example, in each of the retrieval result corresponding sentences BA1 to BA3 contained in the unprocessed sentence of FIG. 3A, the item value of the facility genre/facility brand item is matched with "X restaurant". In this case, the output sentence generation unit 13 erases the item value of the facility genre/facility brand item from each of the retrieval result corresponding sentences BA1 to BA3 contained in the unprocessed sentence as illustrated in FIG. 3A.

With the above process, the following effects are achieved. When the retrieval result is provided by voice, it is possible to prevent that the facility genre information/facility brand information of the same content is repeatedly output by voice. The redundancy in the information output by voice can be reduced. The user is able to easily sequentially understand the content of the voice. In particular, in a case where all the facilities found in the retrieval have the same content of the facility genre information/facility brand information, the facility genre information/facility brand information does not affect a user's decision making when the user selects a facility. Therefore, in a case where all the facilities found in the retrieval have the same content of the facility genre information/facility brand information, there is no disadvantage to the user when the retrieval result is provided by voice even if the facility genre information/facility brand information is not output.

Further, the facility genre information/facility brand information of the retrieval result corresponding sentences BA1 to BA3 is erased even by the first process on the facility genre/facility brand item, but is described to be erased by both the first process and the second process for the convenience of explanation. In practice, information which is determined to be erased by any one of the first to third processes may not be erased by other process.

Further, in some implementations, the output sentence generation unit 13 erases the facility genre information/facility brand information from each retrieval result corresponding sentence contained in the unprocessed sentence in a case where the value of the facility genre information/facility brand information of each retrieval result corresponding sentence contained in the unprocessed sentence is matched. In this regard, the facility genre information/facility brand information is not erased from the retrieval result corresponding sentence of the head of the unprocessed sentence. The facility genre information/facility brand information may be erased from the second or later retrieval result corresponding sentence.

<2-3. Third Process on Facility Genre/Facility Brand Item>

Next, the description will be given about the third process which is performed on the facility genre/facility brand item by the output sentence generation unit 13. The output sentence generation unit 13 performs the following process on each retrieval result corresponding sentence contained in the unprocessed sentence. In other words, in a case where the item value of the facility genre/facility brand item (facility genre information/facility brand information) is contained in the item value of the item related to the facility name (facility name information) in one retrieval result corresponding sentence, the output sentence generation unit 13 erases the item value of the facility genre/facility brand item from the one retrieval result corresponding sentence.

For example, in the first retrieval result corresponding sentence BA1 of the unprocessed sentence of FIG. 3A, the item value of the facility genre/facility brand item (facility genre information/facility brand information) is "X restaurant", and the item value of the item related to the facility name (facility name information) is "X restaurant in C town". In other words, facility genre/facility brand information is contained in the facility name information. Therefore, in this case, as illustrated in FIG. 4A, the output sentence generation unit 13 erases the facility genre information/facility brand information from the retrieval result corresponding sentence BA1.

For example, in the first retrieval result corresponding sentence BB1 of the unprocessed sentence of FIG. 3B, the item value of the facility genre/facility brand item (facility genre information/facility brand information) is "Pizza", and the item value of the item related to the facility name (facility name information) is "Pizza Y shop". In other words, the facility genre information/facility brand information is contained in the facility name information. Therefore, as illustrated in FIG. 4B, the output sentence generation unit 13 erases the facility genre/facility brand information from the retrieval result corresponding sentence BB1.

With the above process, the following effects are achieved. In a case where the genre name or the brand name related to the facility is contained in the facility name of the retrieved one facility, the genre name or the brand name is not output by voice independent of the facility name when the information related to the one facility is provided by voice as the retrieval result. With this configuration, the genre name or the brand name is contained in the facility name. If the facility name is heard, it is possible to prevent that the genre name or the brand name is redundantly output by voice even when the genre or the brand of the facility is recalled. With this configuration, the redundancy in the information output by voice can be reduced. The user is able to easily sequentially understand the content of the voice.

<3. Item Related to Facility Name (Item Value: Facility Name Information)>

The output sentence generation unit 13 performs the fourth process on the item related to the facility name (hereinafter, referred to as "facility name item"). The fourth process is a process belonging to the first process in which some of the retrieval result corresponding sentences are erased on the basis of the commonality between the word contained in the retrieval result corresponding sentences and the keyword spoken by the user similarly to the first process.

<3-1. Fourth Process on Facility Name Item>

Hereinafter, the description will be given about the fourth process which is performed on the facility name item by the output sentence generation unit 13. First, the output sentence generation unit 13 determines whether there are a plurality of retrieval result corresponding sentences which are matched in the facility brand in the unprocessed sentence. In a case where there is a plurality of retrieval result corresponding sentences matched in the facility brand, the output sentence generation unit 13 erases the portion of the keyword from the item value of the facility name item (facility name information) with respect to each of the plurality of retrieval result corresponding sentences.

For example, in the example of FIG. 3A, the facility brands of the facilities corresponding to the retrieval result corresponding sentences BA1 to BA3 are matched to be "X restaurant". Therefore, the output sentence generation unit 13 recognizes that the retrieval result corresponding sentences BA1 to BA3 are matched in the facility brands of the corresponding facilities. The output sentence generation unit 13 erases the portion of the keyword ("X restaurant") from the item value of the facility name item (facility name information) with respect to each of the retrieval result corresponding sentences BA1 to BA3 (see FIG. 4A also).

With the above process, the following effects are achieved. In a case where the facility brands of the plurality of facilities found in the retrieval are matched, it is assumed that the keyword spoken by the user is the facility brand, and the keyword indicating the facility brand is contained in each of the plurality of retrieval result corresponding sentences. Therefore, in this case, the portion matched with the keyword in the facility name information is the portion of the facility brand which is already recognized by the user, and can be said as information which is not necessary for the user to hear again as the retrieval result. In this regard, according to the process, the information which the user does not need to hear again can be erased from the information output by voice as the retrieval result. The information volume of the information can be reduced. The user is able to easily sequentially understand the content of the voice.

Further, in some implementations, in a case where the facility brands of the corresponding facilities are different from each other in the plurality of retrieval result corresponding sentences, the erasing of the keyword based on the fourth process is performed on the facility name item of all of the retrieval result corresponding sentences. For example, in the example of FIG. 3B, the retrieval result corresponding sentences BB1 to BB3 each contain the words "Y shop" of the keyword. However, the facility brands of the facilities corresponding to the retrieval result corresponding sentences BB1 to BB3 are different from each other. Therefore, the words "Y shop" is not erased from the facility name information of the retrieval result corresponding sentences BB1 to BB3.

In addition, the output sentence generation unit 13 may be configured to perform the following process on the facility name item as the fourth process instead of the above process. In other words, the output sentence generation unit 13 determines whether there is a plurality of retrieval result corresponding sentences in the unprocessed sentence in which the facility brands of the corresponding facilities are matched. In a case where there is a plurality of retrieval result corresponding sentences in which the facility brands of the corresponding facilities are matched, the output sentence generation unit 13 determines whether the keyword represents the facility brand. In a case where the keyword represents the facility brand, the output sentence generation unit 13 erases the portion of the keyword from the item value of the facility name item (facility name information) with respect to each of the plurality of retrieval result corresponding sentences in which the facility brands of the corresponding facilities are matched.

For example, in the example of FIG. 3A, the facility brands of the facilities corresponding to the retrieval result corresponding sentences BA1 to BA3 are matched to be "X restaurant". Further, the keyword spoken by the user is "X restaurant", and the facility brand indicated by the keyword and the facility brands of the facilities corresponding to the retrieval result corresponding sentences BA1 to BA3 are matched. Therefore, the output sentence generation unit 13 erases the portion of the keyword ("X restaurant") from the item value of the facility name item (facility name information) with respect to each of the retrieval result corresponding sentences BA1 to BA3.

With the above process, the following effects are achieved. In a case where the facility brands of the plurality of facilities found in the retrieval are common, and the keyword spoken by the user indicates the facility brand, the portion of the facility brand contained in the facility name information is the portion which is already recognized by the user, and can be said as information which is not necessary for the user to hear again as the retrieval result. In this regard, according to the process, the information which the user does not need to hear again can be erased from the information output by voice as the retrieval result. The information volume of the information can be reduced. The user is able to easily sequentially understand the content of the voice.

As described above, the process performed on each item by the output sentence generation unit 13 has been described. As described in the comparison between FIGS. 3A and 4A and the comparison between FIGS. 3B and 4B, as a result of the generated output sentence in the above process, the output sentence is reduced in the information volume and in redundancy compared to the unprocessed sentence. When the above process is performed to generate the output sentence from the unprocessed sentence, the output sentence generation unit 13 registers output sentence information indicating the generated output sentence to the output sentence storage unit 23.

The output sentence output unit 14 generates voice data to output the output sentence by voice on the basis of the output sentence registered in the output sentence storage unit 23, and outputs the voice signal based on the voice data to the voice output device 3 so as to output the output sentence to the voice output device 3 by voice. With this configuration, the output sentence is output to the user by voice as the retrieval result. Further, the output sentence output unit 14 appropriately performs the process on the basis of a voice synthesizing process (the data necessary for performing the process is assumed to be registered appropriately) and other existing techniques.

Figure 5:
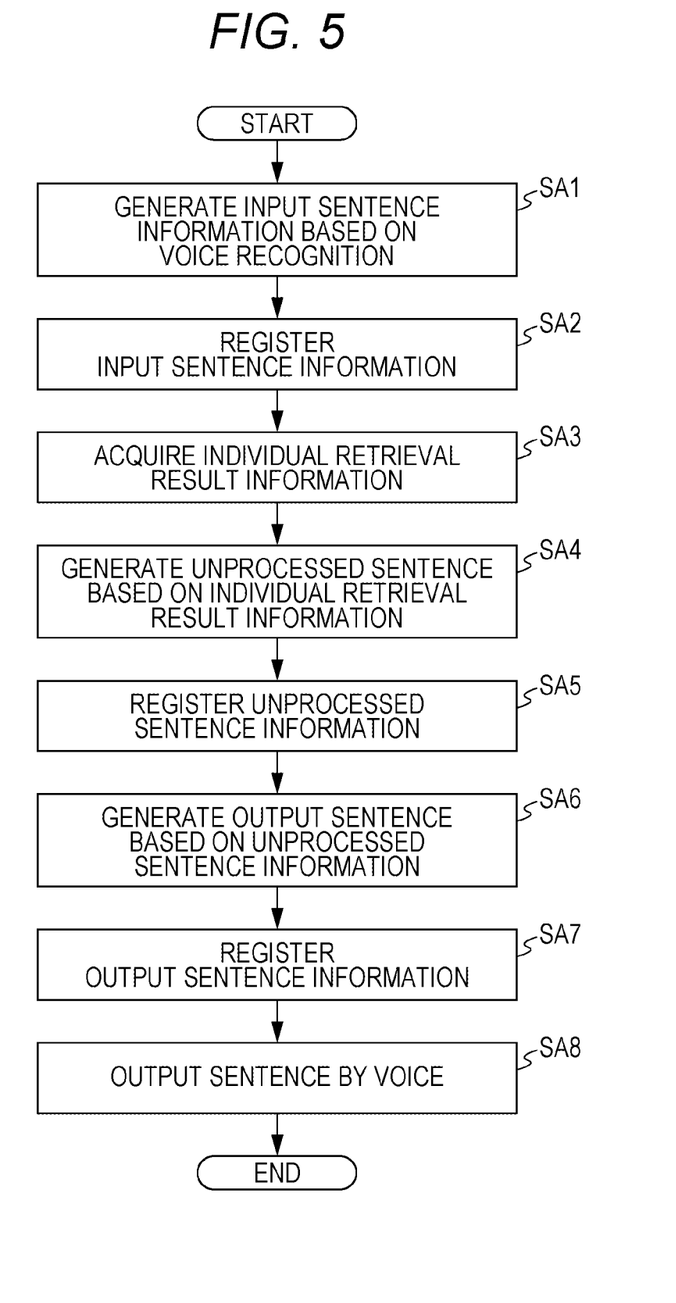
FIG. 5 is a flowchart illustrating an exemplary operation of the retrieval result providing device according to an embodiment of the invention.

Next, the operation of the retrieval result providing device 1 will be described using a flowchart. FIG. 5 is a flowchart illustrating an exemplary operation of the retrieval result providing device 1. In a case where the user operates the dedicated button to speak the retrieval request sentence, the retrieval result providing device 1 performs the following process.

As described above, in a case where the user causes the retrieval result providing device 1 to retrieve a facility to obtain a retrieval result, the user operates the dedicated button to speak the retrieval request sentence. The retrieval request sentence spoken by the user is collected by the sound collecting device 2, and output to the voice recognition unit 10 as a voice signal.

As illustrated in the flowchart of FIG. 5, the voice recognition unit 10 recognizes the voice based on the voice signal input from the sound collecting device 2, and generates the input sentence information indicating the retrieval request sentence (step SA1). The voice recognition unit 10 registers the generated input sentence information to the input sentence storage unit 21 (step SA2). The retrieval unit 11 analyzes the input sentence information registered in the input sentence storage unit 21, retrieves the facility on the basis of an analysis result, and acquires the individual retrieval result information (step SA3). The unprocessed sentence generation unit 12 generates the unprocessed sentence on the basis of each piece of the individual retrieval result information acquired by the retrieval unit 11 (step SA4). The unprocessed sentence generation unit 12 registers the unprocessed sentence information indicating the generated unprocessed sentence to the unprocessed sentence storage unit 22 (step SA5).

The output sentence generation unit 13 performs the first process (including the fourth process), the second process, and the third process on the basis of the unprocessed sentence information registered in the unprocessed sentence storage unit 22 so as to generate the output sentence (step SA6). The output sentence generation unit 13 registers the output sentence information indicating the generated output sentence to the output sentence storage unit 23 (step SA7). The output sentence output unit 14 outputs the voice signal to the voice output device 3 on the basis of the output sentence information registered in the output sentence storage unit 23, and outputs the output sentence by voice. As a result, the user can acquire the retrieval result by voice.

Hitherto, while implementations have been described, the implementations are given as merely exemplary forms of the disclosure, and the technical range of the disclosure is not interpreted in a limited way. In other words, various modification can be made without departing from the scope or the primary features.

For example, the description has been given about the process of the retrieval result providing device 1 as an example where a facility is retrieved according to a user's request in the above-described implementations. However, the device to which the disclosure is applied is not limited to the retrieval result providing device 1 which retrieves a facility and provides a retrieval result related to the facility. As an example, the disclosure can be applied to the retrieval result providing device 1 which performs retrieval based on the keyword designated by the user from a reception history of an email to acquire the individual retrieval result information containing the item values of a plurality of items (for example, "name registered in an address book of a sending source", "email address of a sending source", "reception date", "case name", etc.). In other words, the disclosure can be widely applied to the retrieval result providing device 1 which performs the retrieval based on the keyword to acquire one or more individual retrieval results having the item values of one or more items, and provides a retrieval result on the basis of the individual retrieval result.

For example, in the above-described implementations, the output sentence generation unit 13 performs three processes of the first process (including the fourth process), the second process, and the third process on the unprocessed sentence to generate the output sentence. In this regard, the output sentence generation unit 13 may be configured to combine and perform two of these three processes. In addition, the output sentence generation unit 13 may be configured to perform one of these three processes.

For example, in the above-described implementations, the retrieval result providing device 1 has been described as a device which is mounted in the vehicle. However, the retrieval result providing device 1 is not necessarily an in-vehicle device, and may not be used in the vehicle. For example, a portable terminal such as a so-called smart phone and a tablet-type computer may be configured to function as the retrieval result providing device 1. In addition, a dedicated terminal called an AI speaker or a smart speaker may be configured to function as the retrieval result providing device 1. Besides, the navigation device 4 may be configured to function as the retrieval result providing device 1.

It is intended that the foregoing detailed description be regarded as illustrative rather than limiting, and that it be understood that it is the following claims, including all equivalents, that are intended to define the spirit and scope of this disclosure.

What is claimed is:

1. A retrieval result providing device comprising:
  memory; and
  a processor configured to execute instructions stored in the memory and to:
    recognize a voice collected by a sound collecting device;
    when a keyword and a retrieval request sentence to request the retrieval based on the keyword are contained in the voice, perform retrieval based on the keyword to obtain one or more individual retrieval results which include item values of one or more items;
    generate an unprocessed sentence in which retrieval result corresponding sentences based on the individual retrieval results are arranged in a predetermined order, and the item values are arranged according to a predetermined rule in each of the retrieval result corresponding sentences;
    perform at least one of:
      a first process in which some of the retrieval result corresponding sentences are erased on the basis of a commonality between a word and the keyword contained in the retrieval result corresponding sentences from each of the retrieval result corresponding sentences contained in the unprocessed sentence,
      a second process in which some of the retrieval result corresponding sentences are erased on the basis of a commonality of the item value of a specific item in the different retrieval result corresponding sentences in the unprocessed sentence, or
      a third process in which some of the retrieval result corresponding sentences are erased on the basis of a commonality of the item values of a plurality of the different items in one retrieval result corresponding sentence contained in the unprocessed sentence, and
      generate an output sentence from the unprocessed sentence; and
    output a voice based on the output sentence to a voice output device;
    wherein in a case where the keyword is contained in the item value of the specific item, the processor is configured to erase all of the item values or a portion of the keyword of the item value from the retrieval result corresponding sentences contained in the unprocessed sentence in the first process.

2. A retrieval result providing device comprising:
memory; and
a processor configured to execute instructions stored in the memory and to:
- recognize a voice collected by a sound collecting device;
- when a keyword and a retrieval request sentence to request the retrieval based on the keyword are contained in the voice, perform retrieval based on the keyword to obtain one or more individual retrieval results which include item values of one or more items;
- generate an unprocessed sentence in which retrieval result corresponding sentences based on the individual retrieval results are arranged in a predetermined order, and the item values are arranged according to a predetermined rule in each of the retrieval result corresponding sentences;
- perform at least one of:
  - a first process in which some of the retrieval result corresponding sentences are erased on the basis of a commonality between a word and the keyword contained in the retrieval result corresponding sentences from each of the retrieval result corresponding sentences contained in the unprocessed sentence,
  - a second process in which some of the retrieval result corresponding sentences are erased on the basis of a commonality of the item value of a specific item in the different retrieval result corresponding sentences in the unprocessed sentence, or
  - a third process in which some of the retrieval result corresponding sentences are erased on the basis of a commonality of the item values of a plurality of the different items in one retrieval result corresponding sentence contained in the unprocessed sentence, and
- generate an output sentence from the unprocessed sentence; and
- output a voice based on the output sentence to a voice output device;
- wherein in a case where a concept indicated by the item value of the specific item and a concept indicated by the keyword are identical, the processor is configured to erase the item value from each of the retrieval result corresponding sentences contained in the unprocessed sentence in the first process.

3. The retrieval result providing device according to claim 2, wherein
the retrieval request sentence is a sentence which contains a region name as the keyword and requests to retrieve a facility within a region indicated by the region name,
the item contains an item related to a facility address, and
in a case where a region indicated by the item value of the item related to the facility address and the region indicated by the region name as the keyword are identical, the processor is configured to erase the item value from each of the retrieval result corresponding sentences contained in the unprocessed sentence in the first process.

4. A retrieval result providing device comprising:
memory; and
a processor configured to execute instructions stored in the memory and to:
- recognize a voice collected by a sound collecting device;
- when a keyword and a retrieval request sentence to request the retrieval based on the keyword are contained in the voice, perform retrieval based on the keyword to obtain one or more individual retrieval results which include item values of one or more items;
- generate an unprocessed sentence in which retrieval result corresponding sentences based on the individual retrieval results are arranged in a predetermined order, and the item values are arranged according to a predetermined rule in each of the retrieval result corresponding sentences;
- perform at least one of:
  - a first process in which some of the retrieval result corresponding sentences are erased on the basis of a commonality between a word and the keyword contained in the retrieval result corresponding sentences from each of the retrieval result corresponding sentences contained in the unprocessed sentence,
  - a second process in which some of the retrieval result corresponding sentences are erased on the basis of a commonality of the item value of a specific item in the different retrieval result corresponding sentences in the unprocessed sentence, or
  - a third process in which some of the retrieval result corresponding sentences are erased on the basis of a commonality of the item values of a plurality of the different items in one retrieval result corresponding sentence contained in the unprocessed sentence, and
- generate an output sentence from the unprocessed sentence; and
- output a voice based on the output sentence to a voice output device;
wherein:
the retrieval request sentence is a sentence to request to retrieve a facility corresponding to the keyword,
the unprocessed sentence contains the retrieval result corresponding sentence for each retrieved facility,
the item contains an item related to a facility name, and
in a case where facility brands of facilities corresponding to a plurality of the retrieval result corresponding sentences are matched, the processor is configured to perform a fourth process of erasing a portion of the keyword from the item value of an item related to the facility name of the plurality of the retrieval result corresponding sentences in the first process which is performed on the item related to the facility name.

5. The retrieval result providing device according to claim 1, wherein
the retrieval request sentence is a sentence to request to retrieve a facility corresponding to the keyword,
the unprocessed sentence contains the retrieval result corresponding sentence for each retrieved facility,
the item contains an item related to a facility name, and
in a case where facility brands of facilities corresponding to a plurality of the retrieval result corresponding sentences are matched and the keyword indicates the facility brand, the processor is configured to perform a fourth process of erasing a portion of the keyword from the item value of an item related to the facility name of the plurality of the retrieval result corresponding sentences in the first process which is performed on the item related to the facility name.

6. A retrieval result providing device comprising:
memory; and
a processor configured to execute instructions stored in the memory and to:
recognize a voice collected by a sound collecting device;
when a keyword and a retrieval request sentence to request the retrieval based on the keyword are contained in the voice, perform retrieval based on the keyword to obtain one or more individual retrieval results which include item values of one or more items;
generate an unprocessed sentence in which retrieval result corresponding sentences based on the individual retrieval results are arranged in a predetermined order, and the item values are arranged according to a predetermined rule in each of the retrieval result corresponding sentences;
perform at least one of:
a first process in which some of the retrieval result corresponding sentences are erased on the basis of a commonality between a word and the keyword contained in the retrieval result corresponding sentences from each of the retrieval result corresponding sentences contained in the unprocessed sentence,
a second process in which some of the retrieval result corresponding sentences are erased on the basis of a commonality of the item value of a specific item in the different retrieval result corresponding sentences in the unprocessed sentence, or
a third process in which some of the retrieval result corresponding sentences are erased on the basis of a commonality of the item values of a plurality of the different items in one retrieval result corresponding sentence contained in the unprocessed sentence, and
generate an output sentence from the unprocessed sentence; and
output a voice based on the output sentence to a voice output device;
wherein in a case where the item values of the specific items in a plurality of the different retrieval result corresponding sentences are matched in the unprocessed sentence, the processor is configured to erase the item value from each of the plurality of the different retrieval result corresponding sentences or from each of the retrieval result corresponding sentences except the retrieval result corresponding sentence in a head of the plurality of the different retrieval result corresponding sentences in the second process.

7. The retrieval result providing device according to claim 6, wherein
the retrieval request sentence is a sentence to request to retrieve a facility corresponding to the keyword,
the item contains an item related to a facility address, and
in a case where the item values of items related to the facility addresses in a plurality of the different retrieval result corresponding sentences are matched in the unprocessed sentence, the processor is configured to erase the item value from each of the plurality of the different retrieval result corresponding sentences or from each of the retrieval result corresponding sentences except the retrieval result corresponding sentence in a head of the plurality of the different retrieval result corresponding sentences in the second process.

8. The retrieval result providing device according to claim 6, wherein
the retrieval request sentence is a sentence to request to retrieve a facility corresponding to the keyword,
the item contains an item related to a facility genre or a facility brand, and
in a case where the item values of the items related to the facility genre or the facility brand in a plurality of the different retrieval result corresponding sentences are matched in the unprocessed sentence, the processor is configured to erase the item value from each of the plurality of the different retrieval result corresponding sentences or from each of the retrieval result corresponding sentences except the retrieval result corresponding sentence in a head of the plurality of the different retrieval result corresponding sentences in the second process.

9. A retrieval result providing device comprising:
memory; and
a processor configured to execute instructions stored in the memory and to:
recognize a voice collected by a sound collecting device;
when a keyword and a retrieval request sentence to request the retrieval based on the keyword are contained in the voice, perform retrieval based on the keyword to obtain one or more individual retrieval results which include item values of one or more items;
generate an unprocessed sentence in which retrieval result corresponding sentences based on the individual retrieval results are arranged in a predetermined order, and the item values are arranged according to a predetermined rule in each of the retrieval result corresponding sentences;
perform at least one of:
a first process in which some of the retrieval result corresponding sentences are erased on the basis of a commonality between a word and the keyword contained in the retrieval result corresponding sentences from each of the retrieval result corresponding sentences contained in the unprocessed sentence,
a second process in which some of the retrieval result corresponding sentences are erased on the basis of a commonality of the item value of a specific item in the different retrieval result corresponding sentences in the unprocessed sentence, or
a third process in which some of the retrieval result corresponding sentences are erased on the basis of a commonality of the item values of a plurality of the different items in one retrieval result corresponding sentence contained in the unprocessed sentence, and
generate an output sentence from the unprocessed sentence; and
output a voice based on the output sentence to a voice output device;
wherein in a case where the item value of one item is contained in the item value of another item in one of the retrieval result corresponding sentences contained in the unprocessed sentence, the processor is configured to erase the item value of one item from the retrieval result corresponding sentence in the third process.

10. The retrieval result providing device according to claim 9, wherein
- the retrieval request sentence is a sentence to request to retrieve a facility corresponding to the keyword,
- the item contains an item related to a facility genre or a facility brand, and an item related to a facility name, and
- in a case where the item value of the item related to the facility genre or the facility brand is contained in the item value of the item related to the facility name in one of the retrieval result corresponding sentences contained in the unprocessed sentence, the processor is configured to erase the item value of the item related to the facility genre or the facility brand from the retrieval result corresponding sentences.

11. A retrieval result providing method comprising:
- recognizing, by a processor of a retrieval result providing device, a voice collected by a sound collecting device;
- performing, by the processor, in a case where a keyword and a retrieval request sentence to request a retrieval based on the keyword are contained in the recognized voice, a retrieval based on the keyword to obtain one or more individual retrieval results which include item values of one or more items;
- generating, by the processor, an unprocessed sentence in which retrieval result corresponding sentences based on the individual retrieval results are arranged in a predetermined order, and the item values are arranged in a predetermined rule in each of the retrieval result corresponding sentences;
- performing, by the processor, at least one of:
  - a first process in which some of the retrieval result corresponding sentences are erased on the basis of a commonality between a word and the keyword contained in the retrieval result corresponding sentences from each of the retrieval result corresponding sentences contained in the unprocessed sentence, wherein in a case where the keyword is contained in the item value of the specific item, the processor erases all of the item values or a portion of the keyword of the item value from the retrieval result corresponding sentences contained in the unprocessed sentence,
  - a second process in which some of the retrieval result corresponding sentences are erased on the basis of a commonality of the item value of a specific item in the different retrieval result corresponding sentences in the unprocessed sentence, or
  - a third process in which some of the retrieval result corresponding sentences are erased on the basis of a commonality of the item values of a plurality of the different items in one retrieval result corresponding sentence contained in the unprocessed sentence, and
- generating an output sentence from the unprocessed sentence; and
- outputting, by the processor, a voice based on the output sentence to a voice output device.

* * * * *